UNITED STATES PATENT OFFICE.

LUDWIG HATSCHEK, OF VÖCKLABRUCK, AUSTRIA-HUNGARY.

MANUFACTURE OF IMITATION-STONE PLATES, SLABS, OR TILES.

No. 12,594. Specification of Reissued Letters Patent. Reissued Jan. 15, 1907.

Original No. 769,078, dated August 30, 1904. Application for reissue filed August 20, 1906. Serial No. 331,407.

*To all whom it may concern:*

Be it known that I, LUDWIG HATSCHEK, a subject of the Emperor of Austria-Hungary, residing at Vöcklabruck, in the Empire of Austria-Hungary, have invented certain new and useful Improvements in the Manufacture of Imitation-Stone Plates, Slabs, or Tiles; and I do hereby declare the following to be a full, clear, and exact description of the invention, such as will enable others skilled in the art to which it appertains to make and use the same.

This invention relates to the production of artificial-stone plates from hydraulic cement—*e. g.*, Portland cement, Roman cement, hydraulic lime, or like cements which set with and under water. These stone plates have a great resisting power against atmospheric influences, and especially against water and change of temperature and also against frost and mechanical blows.

The invention is carried into effect by mixing intimately fibrous material—such as asbestos, for example—in the presence of a great bulk of water with hydraulic cement and by working up this watery mixture to plates of the desired thickness in the manner of the process of making cardboard. The cardboard-like plates obtained are then pressed under high pressure, whereby they may, if desired, be caused to receive any predetermined shape or appearance. After some time the product obtained becomes as hard as stone by the setting of the cement. The mixing of the materials to be employed and the working up of the mixture are preferably carried out in the usual machines for making cardboard or paper, whereby the quantity of water may be even larger than in making paper or cardboard.

The process is based, as I have found, on the fact that in working a hydraulic cement with a large bulk of water and with the addition of fibrous material—*e. g.*, asbestos—the setting or hardening power of the cement is not destroyed, and the hydraulic cement added slowly to the well-divided asbestos is intimately associated with the latter, so that no separation takes place, even if the weight of the cement amounts to four to nine times the weight of the asbestos. The water is and remains clear even after a long time. The hydraulic cement of the mixture seems to swell up, taking the appearance of a more or less colloidal, starch, or paste-like mass. These facts explain, perhaps, that such a mixture can undergo the working on the cardboard-machine without setting or hardening and without separation of the cement during this process and that in consequence of the layer-like structure of the plates obtained they can be subjected to a very high pressure without causing any particles of the mass to be pressed out laterally. Only clear water escapes, and the plates retain their original dimensions apart from the thickness reduced by the pressure.

In carrying out the process I disintegrate the desired quantity of fibrous material—*e.g.* asbestos—in the presence of water in such a way that the single fibers of the material are separated from each other. Then the hydraulic binding medium—*e. g.*, hydraulic cement—is added and well intermingled and worked with large quantities of water, whereupon the mixture is immediately worked up in the usual way of making cardboard by means of cardboard-machines. In such a way it is possible to produce an article which contains eighty to ninety per cent. of cement with twenty to ten per cent. of fibrous material.

The carrying out of the process may be explained in a more detailed manner by the following example with the use of a well-known cardboard-machine: Into a mixing and disintegrating machine of about three to five cubic meters capacity fifty kilograms of asbestos are introduced. The asbestos, which is preferably previously disintegrated in an edge-mill, is subjected to the treatment in the said mixing-machine until it is sufficiently broken up—that is, until the fibers are as much as possible separated. Then the required proportion of the hydraulic cement—*e. g.*, about two hundred and fifty kilograms—is gradually added, the entire bulk being mixed thoroughly. The mixture thus prepared is then caused to flow immediately into a vessel with a stirring device, the capacity of which vessel is preferably five to six times greater than that of the mixing-machine. The mixture is diluted with five to six times the quantity of water, the mixture being continuously agitated or stirred. From this vessel the thin paste is immediately conveyed to the cardboard-making machine in order to obtain a cardboard-like product. In the cardboard-making machine the thin paste containing the asbestos and hydraulic cement is thus conveyed to or upon an endless rotating porous fabric, through which the water of the thin paste or pulp flows off, leaving on the upper side the hydraulic cement intermixed with asbestos as a thin layer, which layer is conducted to a rotating roller, on which this layer is taken off from the said endless fabric and rolled up thereon. Thus a sheet is formed composed of several superimposed layers, the number of which layers corresponds to the number of rotations of said roller. As soon as the product thus obtained on the roller has reached the desired thickness the same is cut to the desired size and pressed to the desired shape, whereupon it is caused to set in suitable rooms.

The plates produced need no impregnating or additional means for hardening and no covering or the like for their durability. After a sufficiently long time of hardening they are so hard and at the same time so tough and strong that those of a thickness of about four millimeters, for example, do not crack, even if they fall a distance of three meters and more to the ground. The plates of my invention have the advantage of being frost-proof and of absorbing only very small proportions of water, so that in using them as roofing material, for instance, their weight does not materially increase during moist weather. They are practically waterproof and of course fireproof, as they contain nothing whatever that is combustible. Unlike slate, they are not brittle. They do not fracture, chip, or split into layers as slate does and can be readily sawed, filed, and cut, and nails can be driven through them. Also, due probably to the fact of their being in layers, they are elastic. They also show very important differences and advantages in comparison with slate plates and the plates made from magnesia, oxid of zinc, or Sorel cement, in which oxychlorids of zinc or magnesia constitute the cementing agent, because these substances must be mixed to a plastic condition and can only be applied by spreading with a trowel or similar tool or by forcing into molds, and the result when exposed to the weather is liable to disintegrate. The product of the present invention also differs from other artificial stones from hydraulic cement and asbestos produced in the ordinary way, because when those artificial stones are produced in the ordinary way they have to be mixed to a mortar-like plastic compound mechanically under conditions which make it impossible to diffuse the asbestos uniformly through the mass, whereby the product instead of being well mixed, practically homogeneous, and capable of being made into thin uniform smooth sheets has to be spread with a trowel or similar tool or applied to a core or netting of wire or some other sustaining material or be formed in a mold.

The product by me produced and applicable to use for stone plates, slabs, or roofing material, such as tiles or shingles, is different from any kind of artificial stone that has ever heretofore—that is, by any previous invention—been produced, first, because of its composition, containing within the limits heretofore stated, say, eighty-five per cent. of hydraulic cement and fifteen per cent. of asbestos, or thereabout, and, secondly, on account of its physical structure, for looking at any section it will be seen to be made of layers, two kinds of layers, or at least layers which contain chiefly asbestos followed by layers in which the percentage of cement increases. This structure I explain by supposing that as the porous fabric rotates in the bath or fluid containing asbestos fiber and cement particles dominating in the water the cement particles begin to pass through it, while the asbestos fibers are caught, and the layers of asbestos fibers become dense enough to arrest the cement particles, and after that the layer will be composed of a mixture of asbestos and cement particles in the proportion in which they exist in the liquid. The first layer of asbestos deposited on the porous fabric acts as a filter and prevents any further passage of cement through the same, arresting it to form the rest of this layer. This layer will then be stripped off the fabric and carried to the roller, and a new layer will be produced on the porous fabric, as before, and so on, and the layer that is taken off the porous fabric will have an under layer of asbestos and a superimposed layer of asbestos and cement. These successive layers being wound up on the roller to a desirable thickness—say from one-eighth to one-half of an inch—on examining a section of the stone these layers can be easily observed.

I do not claim to be the first to have made an artificial stone, nor do I claim to be the first to employ asbestos and hydraulic cement in making artificial stone; but I believe myself to be the first to have used hydraulic cement and asbestos in such a condition and in such proportions as to result in a product having the structure and the physical qualities above described, to have made artificial stone of such peculiar characteristics that while waterproof and fireproof and having the advantages of hardness, strength, durability, and a certain quality of toughness which enables it to resist strains and shocks which shatter ordinary brittle material like slate it can be made and used in sheets easily cut and sawed into shape and thin enough to serve as a substitute for wooden shingle and slate tile for outdoor roofing, easily nailed in place, as well the first to have found a method by which stone can be made in sheets for the useful purposes pointed out.

The materials are cheap, the process is simple, no hand-labor is required until the sheets are formed, and there is no subsequent expensive treatment, such as drying with intervening soakings with impregnating solutions, the product being simply dried once for all as soon as the sheets are formed.

Having thus fully described my invention and the best means of carrying the same into effect and applying it to use, what I claim, and desire to secure by Letters Patent, is—

1. The process of rendering hydraulic cement colloidal, which consists in working the same with a large bulk of water, that is to say, with sufficient water to allow the particles of cement to be kept in motion and thus segregated, whereby the setting or hardening power of the cement is not destroyed, and, in the presence of other material, as well-divided asbestos, it is intimately associated with the latter, so that even if the weight of the cement be greater than that of the material with which it is mixed, no separation takes place, substantially as set forth.

2. The herein-described process of producing artificial-stone plates, consisting of first mixing fibrous material and hydraulic cement in the presence of a great bulk of water, then forming therefrom a series of thin layers of the mixed cement and fibrous material superposed on each other until the required thickness is secured, then pressing the same and allowing the material to set or harden.

3. The herein-described process of producing artificial-stone plates, consisting of first mixing asbestos fibers and hydraulic cement in the presence of a great bulk of water, then forming therefrom a series of thin layers of the mixed cement and asbestos superposed on each other until the required thickness is secured, then pressing the same and allowing the material to set or harden, substantially as set forth.

4. The herein-described process of producing artificial-stone plates, consisting in mixing fibrous material and hydraulic cement in a bulk of water sufficient to render the cement colloidal, then forming therefrom a series of thin layers of the mixed cement and fibrous material superposed on each other until the required thickness is secured, then pressing the same and allowing the material to set or harden.

5. The herein-described process of producing artificial plates, consisting of first mixing fibrous material and hydraulic cement in the presence of a great bulk of water, to render the cement colloidal, then forming therefrom a series of thin layers of the mixed cement and fibrous material superposed on each other until the required thickness is secured, then pressing the same and allowing the material to set or harden.

6. An artificial-stone product consisting of a major proportion of hydraulic cement and a minor proportion of fibrous material, the product being in layers and elastic, non-brittle and penetrable to nails, that is, capable of being nailed similar to paper building-board or wood, incombustible and water and frost resistant, of hardness, strength and durability, and having a certain quality of toughness which enables it to resist strains and shocks which would shatter ordinary brittle material, such as slate, and the product being, finally, easily cut and sawed into shape and capable of being presented thin enough to serve as a substitute for wooden shingle and slate tile, &c., substantially as described.

7. A product of the invention hereinbefore set forth, being a composition containing hydraulic cement which has been rendered colloidal.

In testimony whereof I affix my signature in the presence of two witnesses.

LUDWIG HATSCHEK.

Witnesses:
MAX EHRENZWEIG,
ALVESTO S. HOGUE.